US008781642B2

(12) United States Patent
Tarasinski et al.

(10) Patent No.: US 8,781,642 B2
(45) Date of Patent: Jul. 15, 2014

(54) VEHICLE CONTROL SYSTEM

(75) Inventors: Nicolai Tarasinski, Frankenthal (DE); Klaus Hahn, Mannheim (DE)

(73) Assignee: Deere & Company, Moline, IL (US)

( * ) Notice: Subject to any disclaimer, the term of this patent is extended or adjusted under 35 U.S.C. 154(b) by 1598 days.

(21) Appl. No.: 12/060,440

(22) Filed: Apr. 1, 2008

(65) Prior Publication Data

US 2008/0275596 A1 Nov. 6, 2008

(30) Foreign Application Priority Data

May 4, 2007 (DE) ......................... 10 2007 021 499

(51) Int. Cl.
*G05D 3/00* (2006.01)

(52) U.S. Cl.
USPC .......... 701/1; 701/93; 705/1; 476/41; 477/44; 290/40 C; 359/407; 56/10.2 R; 340/441; 340/539.1; 192/85 R

(58) Field of Classification Search
USPC ..................... 701/93; 705/1; 476/41; 477/44; 290/40 C; 359/407; 56/10.2 R; 340/441, 340/539.1; 192/85 R
See application file for complete search history.

(56) References Cited

U.S. PATENT DOCUMENTS 4,893,981 A 1/1990 Yoshinada et al.
5,727,387 A 3/1998 Hosseini et al.
2004/0116240 A1* 6/2004 Taketsuna et al. .............. 476/41
2004/0127330 A1* 7/2004 Sawada et al. .................. 477/44
2004/0207205 A1* 10/2004 Kikuchi et al. ............. 290/40 C
2005/0131614 A1* 6/2005 Isogai et al. ..................... 701/93
2006/0077543 A1* 4/2006 Miyoshi et al. ............... 359/407
2006/0123757 A1* 6/2006 Baumgarten et al. ...... 56/10.2 R
2006/0220834 A1* 10/2006 Maeng ....................... 340/539.1
2006/0265228 A1* 11/2006 Ando ................................ 705/1
2008/0204214 A1* 8/2008 Reith et al. .................... 340/441
2008/0296124 A1* 12/2008 Schiele et al. ............. 192/85 R

FOREIGN PATENT DOCUMENTS

DE 10209206 9/2003
DE 102005041086 3/2006
DE 10 2005 000 633 7/2006
DE 102005000633 7/2006
DE 102006034198 2/2007
EP 1510436 3/2005
EP 1777094 4/2007
GB 2 350 593 12/2000
WO 2007/006800 6/2007

OTHER PUBLICATIONS

Definition of phrase 'manual operation' from Dictionary of Science and Technology, 1992 and/or 1996 edition, 1 page.*

(Continued)

*Primary Examiner* — Muhammad Shafi
*Assistant Examiner* — Sanjeev Malhotra

(57) ABSTRACT

The present invention relates to control system for a vehicle. The control system includes a manually operable control lever, such as a joystick, an actuator, a sensor and a control unit. The control lever sets a state variable of the vehicle. The actuator applies a force to the control lever. The sensor senses a vehicle parameter and transmits a parameter signal to the control unit. The control unit determines a current operating state of the vehicle. The control unit, depending on the present operating state of the vehicle, controls the actuator and causes it to apply a changed, predetermined force to the control lever, in order to make the operator aware of an unsafe operating state.

5 Claims, 5 Drawing Sheets

Fig. 2

(56) References Cited

OTHER PUBLICATIONS

Definition of phrase 'control system' from Dictionary of Science and Technology, 1992 edition, 1 page.*

"Actuator" definition from Academic Press Dictionary of Scienbce and Technology, copyright 1992, 1 page.*

German Search Report, received Jan. 30, 2012 (5 pages).

* cited by examiner

VEHICLE CONTROL SYSTEM

FIELD OF THE INVENTION

The present invention relates to a vehicle control system which includes a manually operable control lever.

BACKGROUND OF THE INVENTION

Manually operable control levers have long been used in vehicle control systems. They can be used to set, for example, the speed, the steering, an operating function or a gear setting of the vehicle. The control lever can be a joystick for controlling a loader tool. The vehicle may be an agricultural vehicles, such as a tractor, a harvesting machine, a combine harvester, a forage harvester, a self-propelled sprayer, but also an industrial vehicle, such as a construction vehicle, a bulldozer, a road grader, a backhoe excavator, a loader vehicle, a tipper lorry, a crane, or a telescopic loader.

Furthermore, "force feedback" is known from simulator technology where it generally serves to realistically represent forces to which operating elements are subjected, the forces occurring during the operation of an actual machine and having to be applied or overcome by the operator. In a force feedback system, an actuator applies a force to a control lever. The control lever, which generates an electrical signal, can be subjected to a force from the actuator so that the control lever has an operating characteristic customary for the particular type of control lever.

In many vehicles, the operating elements are usually connected mechanically to the machine part adjusted by them. For example, the steering wheel is connected to the steering linkage via the steering shaft. If such a mechanical connection is omitted because of an electronic control of the particular component, then a corresponding feedback to the operator about the states of the machine part and of the machine/vehicle to be simulated is lacking. In such a case, simulator technology is used to cause an actuator to apply a force to the control lever, and the actuator is controlled by a control unit, such that an operating characteristic customary for the control lever can be produced. By this means, an operation, which is as realistic as possible, of the particular function controlled by the control lever is simulated for an operator.

Warning display elements may supply visual or acoustic signals to the operator during the operation of the vehicle. For example, warning lights are primarily provided which indicate a critical state of the vehicle, such as excessive engine oil or coolant temperature.

SUMMARY OF THE INVENTION

Accordingly, an object of this invention is to provide an improved control system wherein an actuator applies forces to a control lever.

A further object of the invention is to provide such a control system wherein extensive assistance is provided a vehicle operator.

A further object of the invention is to provide such a control system wherein an operator is made aware of a critical or non-optimal operating states of the vehicle.

These and other objects are achieved by the present invention, wherein a vehicle control system includes a manually operable control lever, in particular a joystick, an actuator, a sensor and a control unit. The control lever sets a parameter or state variable of the vehicle. The actuator applies a force to the control lever. The sensor senses a status or condition of the vehicle and transmits a signal to the control unit. The control unit, depending on the sensed state of the vehicle, controls the actuator to apply a force to the control lever in order to make the operator aware of an unsafe operating state of the vehicle or an unsafe operating state of an operating function. The changed force could be, for example, a constant or a variable force.

Vehicle operation vehicle may be simplified and optimized if an unsafe or non-optimal operating state is displayed to the operator not only by visual display instruments. Conventionally, the vehicle has a tachometer for displaying engine speed. If the engine is continuously operated above the normal maximum speed in a conventional vehicle, there are no further indicators, apart from increased engine noise, which may not be detected in all cases, even acoustically, with a soundproofed cab. This may lead to engine damage and thus to a longer period without use of the vehicle and thus high costs. Accordingly, such an operating state of the vehicle is brought to the awareness of the operator in a tactile manner, in addition to an acoustic and/or visual warning device. This is advantageous, in particular, when the operator has to react immediately and in any manner as a result of the situation, for example in order to be able to prevent overload of a component of the vehicle or an accident of the vehicle.

In response to a signal from the sensor, the control unit can calculate the direction or position in or into which the control lever should be moved in order to achieve the desired purpose. The tendency of the effects caused during the adjustment of a state variable is known in general. The position and/or the adjustment direction of the control lever that would result in a safe operating state is determined. The actuator is controlled as a function of a comparison between the calculated, favorable direction of movement and/or position and the current direction of movement and/or position of the control lever.

The control unit preferably also receives information about the position of the control lever from a control lever position sensor. Control lever position is taken into consideration in the calculation of the desirable or not desirable adjustment direction or position of the control lever. However, in some applications, the position of the control lever does not need to be taken into consideration. The control unit may derive control lever position and/or its direction of movement from the signal of the sensor or from the change thereof.

The actuator can be operated in two different ways. Firstly, it can generate an adjustment resistance or an amplitude and/or frequency of the mechanical excitation of the control lever which is proportional to the difference between the current position of the control lever and a calculated, optimal position of the control lever, or depends in another way in a constantly and preferably monotonously growing manner on said difference. Therefore, if the control lever is in a particularly unfavorable position, it is very difficult to bring it into an even more unfavorable position, or it vibrates really powerfully and/or rapidly. However, it can easily be moved in the opposite direction and the vibrations lessen or disappear. Secondly, the actuator may become effective if the abovementioned difference exceeds a certain threshold. In this case, the actuator can produce an adjustment resistance which rises in a step-like manner or the amplitude and/or frequency of the mechanical excitation can change in steps. In this embodiment, the adjustment resistance or the amplitude and/or frequency of the mechanical excitation of the input element therefore rises in at least one step. One advantage resides in the easier technical realization, since, in the simplest case, the actuator can be designed such that it can only be switched on and off.

The control unit, depending on the present operating state of the vehicle, could control the actuator such that the control lever can be subjected to a changed, predetermined force, in order therefore to make a non-optimal operating state of the vehicle or a non-optimal operating state of at least one operating function noticeable to the operator.

Preferably, the operating characteristics of the control lever can be changed by applying predetermined, changed force to the control lever. For example, the control lever could be subjected to a force so that that it overall can be operated only under increased application of force by the operator. In other words, the force applied to the control lever by the actuator during a normal operating state of the vehicle is increased by a constant value (offset) if an optimal or safe operating state of the vehicle is not present.

The control lever could be a throttle hand lever which sets the engine or vehicle speed. The control lever may also be a hydraulic control lever which controls a hydraulic function, such as the height adjustment of a three-point implement hitch which includes two lifting cylinders which are controlled by the control lever. The control leer could also control the hydraulic cylinders of a loader or a loader attachment which can optionally be adapted to a tractor. The control lever could also be a gear shift or gear changing lever for controlling the transmission gear.

Preferably, the control lever is a joystick which controls an operating function or a state variable, such as the three-point implement hitch a tractor, or an implement coupled to the vehicle, such as an optional loader attachment, or a cutter bar.

Very preferably, joystick controls a loader or a loader tool. In this case, the force applied to the joystick could depend on the lifting height of the loader or of the loader tool. It may be expedient for the force applied to the joystick to increase with increasing height of the loader or of the loader tool. This enhances safety in a counterweighted vehicle when a loader tool is raised. This is relevant, in particular, to telescopic loaders, since, in addition to the lifting height and the tilting angle of the loader tool, the loader arm or boom can also be changed in length, for example by means of extension or retraction. By this means, there is increasingly the risk of an unbalanced state of the telescopic loader. This applies similarly to cranes.

Preferably, a lower and/or an upper height value of the loader/loader tool can be predetermined, in which a predetermined maximum force acts on the joystick. This signals to the operator that the loader tool is approaching or has reached the maximum or minimum height. The height value could be storable and/or changeable by an operator, and therefore the operator can configure the operating device as a function of the specific task.

As an alternative or in addition, a lower and/or an upper loader tilting angle can be predetermined, in which a predetermined maximum force acts on the joystick. The tilting angle value could likewise be storable and/or changeable by an operator.

The control lever could be a push-button switch or change-over switch for controlling an operating function or a state variable of the vehicle or of an implement. The function controlled by the push-button switch could be activated or deactivated (for example mechanical front wheel drive on/off, power take-off shaft on/off). In the case of a change-over switch, the function controlled by the change-over switch could be changed over between at least two different states (reversing of the gear forward/backward).

The sensor senses a variable which represents a status of the vehicle, such as speed, acceleration, direction of travel, steering angle, deviation from a predetermined direction of travel, spatial position of the vehicle, yaw movement or the yaw moment, presence of an obstruction, engine speed, gear shaft speed, wheel speed, shaft torque, power unit torque output, power unit performance or capacity utilization, the energy consumption, fuel consumption, slippage of the vehicle, axle load, hydraulic pressure or flow, cylinder travel, driving state, motive force of the vehicle, trailer or an implement. The force acting on the vehicle can be a tractive force, a transverse force and/or a supporting force. Accordingly, a sensor could be provided for sensing the speed, the acceleration, the direction of travel, the steering angle, the deviation from a predetermined direction of travel, the spatial position of the vehicle (relative to a reference system) and/or the presence of an obstruction. By means of the sensor, a variable could also be detectable which allows the detection of the rotational speed of an engine shaft or gear shaft, the rotational speed of at least one wheel, the torque transmitted by a shaft, the torque output by a power unit, the performance or the capacity utilization of a power unit, the energy consumption or the fuel consumption of a consumer, the slippage of the vehicle over the ground, an axle load, the pressure or the volumetric flow or an alteration to the volumetric flow of a hydraulic fluid, the travel of a cylinder, the tractive force of a trailer and/or an implement acting on the vehicle, the driving state and/or the motive force of the vehicle. Conventionally, the sensor is configured such that said sensor detects and/or registers a corresponding variable. An (electrical) signal is then generated depending on the detected variable and is transmitted to the control unit. The control unit can control the actuator depending on the present operating state of the vehicle.

The actuator may be an electric, pneumatic or hydraulic actuator, and a variable force may be applied to the control lever. Furthermore, the actuator could have a spring which subjects the control lever to a spring force.

An optimum operating state of the vehicle exists when the vehicle has a minimized fuel consumption, or when the driving speed or the efficiency of the vehicle or individual components are adapted optimally to the present operating mode of the vehicle. In other words, individual components and/or the entire vehicle are set such that the efficiency thereof for the present operating mode of the vehicle is optimized and/or adapted thereto. A present operating mode could be, for example, plowing with a tractor. In a further step, another present operating state could relate to seed planting. An optimal operating state is also desired for the case where the goods treated and/or processed by the vehicle and possibly by an implement adapted to the vehicle have an optimal throughput or turnover, such as when a baler is adapted to the tractor. A round baler should be operated so that hay is received by the round baler at a maximum delivery speed (maximum throughput) without causing a blockage.

A safe operating state of the vehicle is present, in particular, when the engine load, the incline of the vehicle relative to the horizontal, the yaw moment, the counterweight of the vehicle with an implement optionally adapted thereto, the torque load prevailing in the drive train and/or the rotational speed present in the drive train of rotating components and/or the speed of the vehicle (even when cornering) does not exceed a corresponding predetermined threshold. Further parameters relevant to safety are, for example, also engine oil temperature, coolant temperature or hydraulic braking pressure. Accordingly, a safe operating state of the vehicle is present when the corresponding predetermined threshold values are not exceeded or fallen below. A safe operating state of the vehicle is also present when there is no obstruction in the driving area or the effective range of the vehicle. In other words, an unsafe operating state is present when the corresponding predetermined threshold values are exceeded and/or fallen below and/or when there is an obstruction in the driving range or effective range of the vehicle.

The control system of the invention is useful for safe operation of a vehicle when state variables which may not be immediately noticed by the operator. Above all, this could be relevant for trailers (for example a sprayer with an extended spraying boom) attached to the vehicle, which for example carry out rolling and/or yaw movements due to the unevenness of the ground and thus may bring the vehicle and trailer, into a dangerous overall state. In such a case, the control lever (setting the vehicle speed) could be subjected to a force so that the operator is directed to deflect the control lever to reduce speed.

The control unit could control the actuator to apply an essentially constant force to the control lever, such as when the control lever is in a neutral position and is not actuated by an operator.

Alternatively, or an addition, the actuator could apply to the control lever a force with a predetermined profile. The predetermined force profile could have, depending on the actuating travel or the deflection of the control lever or the state variable to be controlled, a constant analytical function. The analytical function could vary over time and in the process take account of a changed operating state of the vehicle.

In particular, if the vehicle approaches an unsafe operating state or the operator misuses an operating function or a vehicle function, the actuator could apply a time-variable force to the control lever. This is useful in particular when the operator is not aware of the operating state, such as when the torque transmitted by a power take-off shaft to an implement exceeds a predetermined limit value. Accordingly, the actuator could make the control lever executes a shaking movement, and thereby make the operator aware in a tactile manner of a critical operating state.

Preferably, a predetermined, varied force is applied to the control lever if an operating state deviates from the optimal operating state or from a safe operating state.

As discussed below, a predetermined, changed force may be applied to the control lever in certain situations. such as if the present operating state or a present state variable of the vehicle or of an operating function of the vehicle exceeds or falls below a predetermined threshold value. This may involve, for example, a pressure, which is above a maximum value, of a hydraulic fluid, by means of which a hydraulic cylinder of a loader can be controlled, where the loader could be adapted to a tractor. Such a situation could draw attention, for example, to overloading when raising the loading shovel.

The control lever could be subjected to a predetermined, varied force if the rotational speed of a shaft and/or the rotational speed of a shaft of an implement deviates from a predetermined rotational speed.

The control lever could also be subjected to a predetermined, varied force if the speed of the vehicle deviates from a predetermined speed. If the vehicle performs an operating function which requires the vehicle to continue to move at an essentially constant speed (for example planting), this fact could be pointed out to the operator by the force to which the control lever is subjected being varied.

Preferably, the control lever can be subjected to a predetermined, variable force which depends on the surface over which the vehicle moves. This could be used in order to reduce or to avoid the self-reinforcing oscillation of the vehicle or of the operating function, which is caused by the vehicle movement.

Preferably, the control lever can be subjected in its neutral position to a predetermined, high force in a certain operating state of the vehicle. The control lever can be deflected once out of its neutral position by means of a correspondingly high application of force by the operator in order to transfer the vehicle and/or an operating function of the vehicle from a secured state into an operating state. By this means, a “force lock” of the function controlled by the control lever can be obtained. In order to control the function, the operator has to exert a relatively high force a first time in order to activate the function at all. If the function is then activated, it is appropriate to no longer subject the control lever to the predetermined high force and/or to only do this again if the control lever has not been actuated for a prolonged period. In the same manner, a starting acknowledgement of the vehicle or a changing acknowledgement for a gear changing operation could be realized, that is to say, the control actually intended by the operator is acknowledged by the high force being overcome.

Furthermore, the control lever could be subjected to a predetermined force in order to make it noticeable to the operator that a change, commanded by the control lever, to a state variable of the vehicle or to an operating function has been set in the meantime.

When a gear shift is controlled by the control lever, but the control lever is not connected mechanically to the gear shift mechanism (because the shift mechanism is controlled by means of an electromagnetic actuator) the operator can be provided with realistic feedback after the gear shift has been carried out. This is because, if the gear shift recently commanded by the control lever is executed, a predetermined force pulse (of low magnitude) can be exerted on the control lever, said force pulse being comparable to the force pulse which is exerted on an control lever, which is connected mechanically to the gear changing location, by the gear shift operation.

Similarly, the control lever could be subjected to a predetermined force in order to make it noticeable to the operator that an implement is coupled to the vehicle, or if an implement is switched on and the latter reaches its rotational operating speed only after a time delay. If the latter is present, the control lever could likewise be subjected to a force pulse.

The level of the force to which the control lever can be subjected can preferably be set individually by the operator. By this means, for example, each operator can set and, if appropriate, store an operating characteristic of the control lever that is matched individually to him. This permits a setting of the control lever characteristic that is matched individually to him and can therefore avoid misoperations and/or can permit an individual, ergonomic operation.

Preferably, a predetermined operating characteristic can be impressed on the control lever so that an operator can re-find a desired setting—which can optionally be set by him, a deflection position or a deflection range of the control lever. Such a desired setting could be the operating depth of the lifting mechanism of a three-point implement attachment, if the lifting mechanism height is set by means of the control lever. If the operating depth of the lifting mechanism is set, the “latching-in” of the control lever could be provided, which can be represented by the control lever being subjected to a corresponding force by the actuator. In a comparable manner, a settable “stop” of the control lever could be provided, the stop optionally being predetermined or settable by the operator and permitting the finding of a certain picking-up height and/or unloading height of a front loader. This could also be useful for finding a certain tilting angle of the shovel or an upper limit of the excavation height (because of a low ceiling height in buildings or a low passage height of doors).

Preferably, the control lever can be subjected to a force so that that an operator avoids an unfavorable setting range of an operating state of an operating function or state variable of the vehicle—for example the resonant frequency of the tires at certain rotational speeds. The resident frequency of the engine suspension, which frequency is dependent on the rotational speed of the engine, and/or the resonant frequency of the vehicle bodywork could also have an unfavorable setting range and, by the control lever being correspondingly subjected to a force, therefore could signal in a comparable manner to the operator to avoid this setting.

In a further embodiment, the control lever can be subjected to a predetermined force which is essentially dependent on the state of another operating element of the vehicle. By this means, for example, a mutual locking of a plurality of operating elements can be simulated, for example a parking brake which can be activated in a tractor by an control lever, and a setting lever for the gear of said tractor, which lever can be controlled by a different control lever. The mechanical coupling of the two control levers that was hitherto necessary can therefore advantageously be omitted.

The force exerted on the control lever by the actuator can be overridden and/or can be switched off by the operator. An overriding of the force exerted on the control lever by the operator should be possible, since the operator is intended not only to have the sensation that he has control over the operation of the vehicle. What is more, for safety reasons, the vehicle is intended to also be able to be operated by the operator if the control lever is subjected to an erroneous force. This could be the case if a sensor erroneously detects a variable or the detected variable is erroneously interpreted, although this has only a low probability of occurring.

In addition to subjecting the control lever to a predetermined force, a visual and/or acoustic signal could be produced. This is appropriate in particular if a safe operating state of the vehicle and/or of an operating function is abandoned. In this case, for example, a light source provided in the control lever could be activated, possibly with increasing light strength with increasing degree of danger. In addition, or alternatively, an acoustic signal in the form of a warning tone (if appropriate with increasing volume) could be generated and brought to the operator's attention. It would therefore be provided that an operator can be warned in a tactile and visual manner at the control lever and acoustically via a loudspeaker in the cabin of a safety risk, preferably relating to a function which is controlled by the control lever.

The vehicle could be a self-propelled working machine or a tractive machine of the agricultural, construction or forestry field. In particular, the vehicle could be a tractor, a harvesting machine, a combine harvester, a forage harvester, a construction machine and/or a forestry machine. Accordingly, the function controlled by the control lever of the operating device could be an operating function of the particular vehicle.

DESCRIPTION OF THE PREFERRED EMBODIMENT

Figure 1:
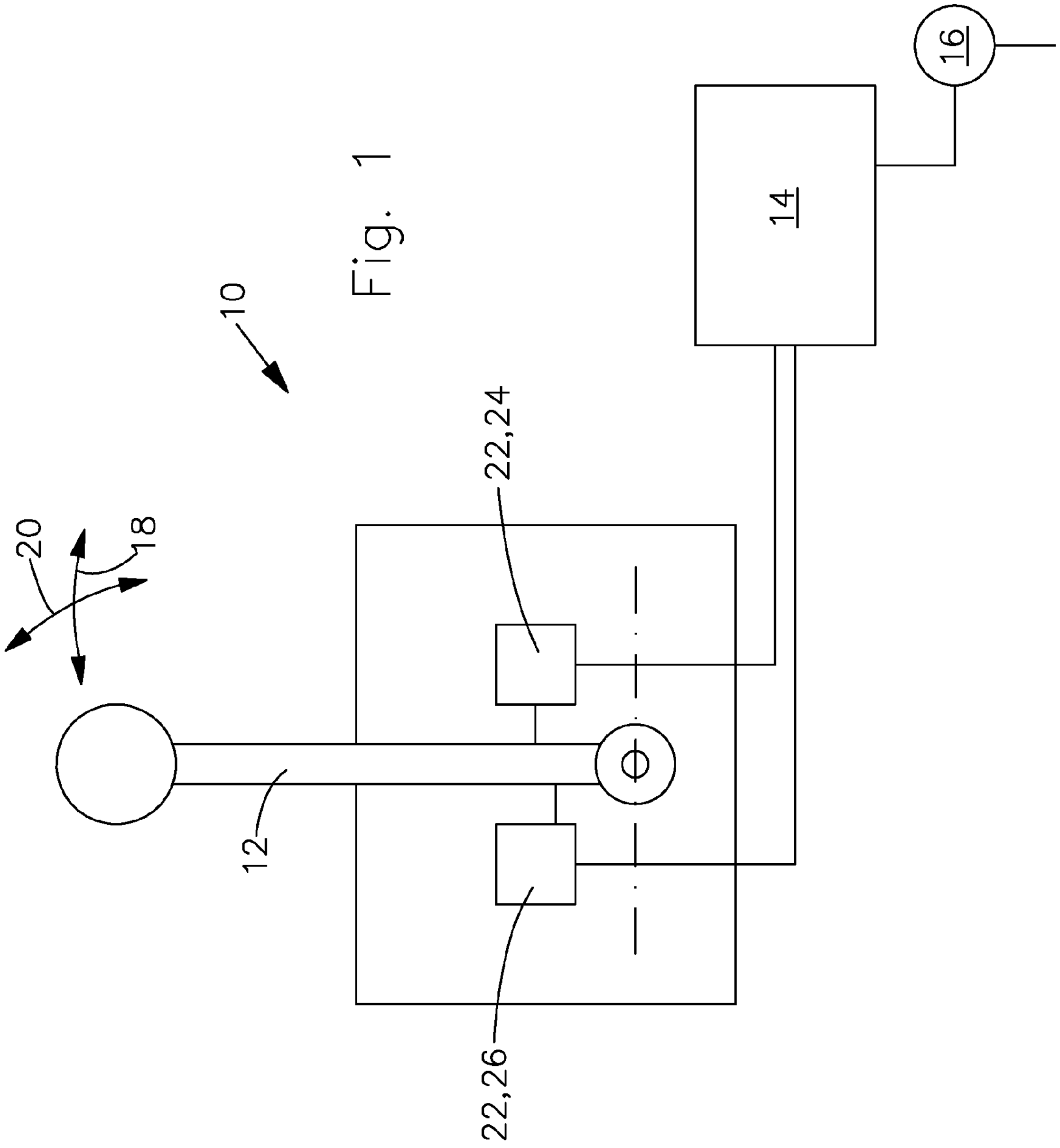
FIG. 1 is a schematic diagram of an embodiment of the present invention.
Figure 2:
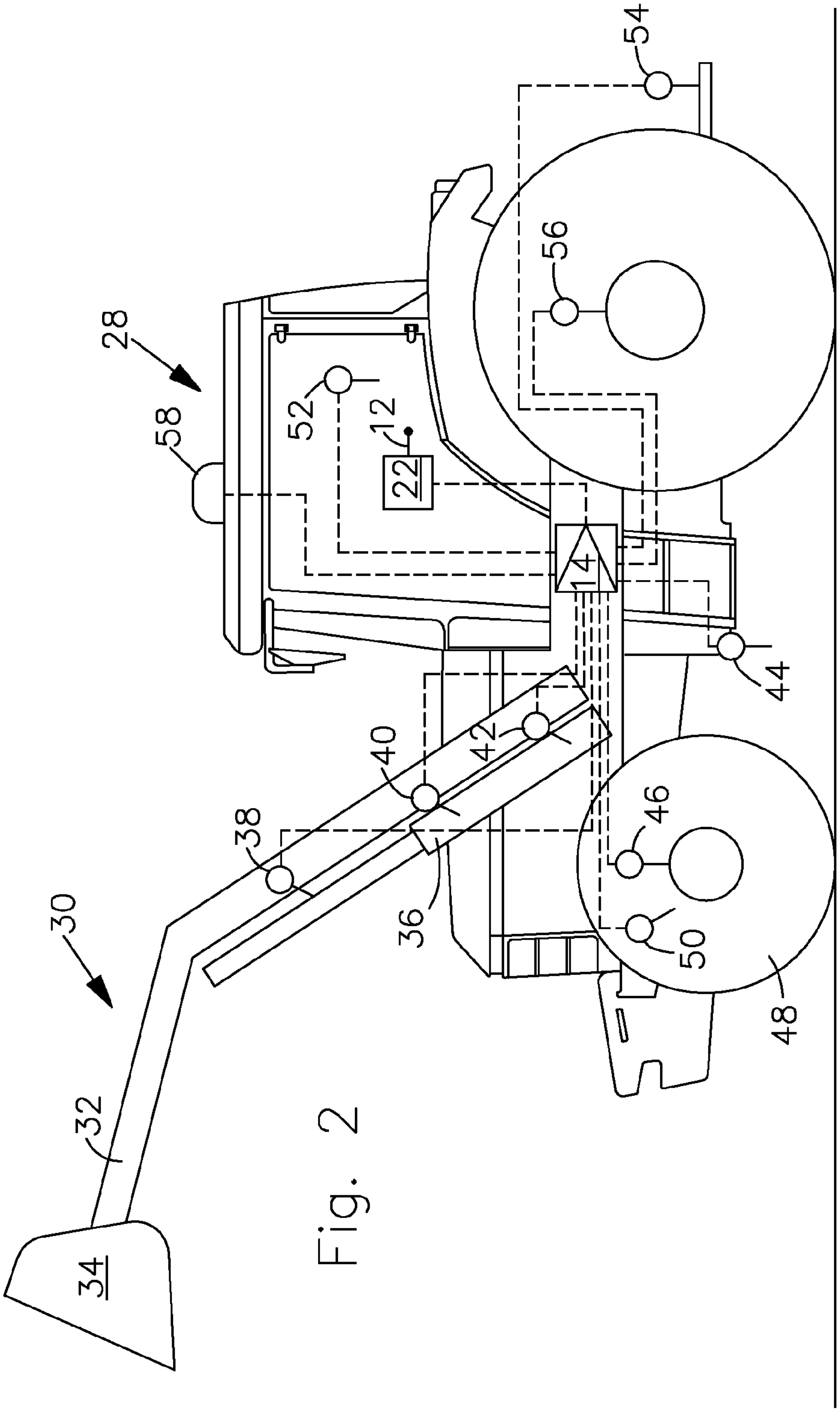
FIG. 2 shows an agricultural vehicle with the control system of the invention.

FIGS. 1 and 2 show an exemplary embodiment of an control system according to the invention. The control system includes an control lever 12, a control unit 14 and a sensor 16. The control lever 12 is a joystick and can be deflected in any direction. The control system of FIG. 1 controls a front loader 30 of an agricultural vehicle, such as a tractor, as shown in FIG. 2. The front loader 30 is controlled hydraulically in which case, the control lever 12 is a hydraulic control lever. Accordingly, when the control lever 12 is deflected in direction 20, the loader shovel is raised or lowered. When the control lever is actuated in direction 18, the loader shovel is tilted in its angle in relation to the horizontal. Accordingly, the front loader is set or controlled by the control lever 12. Furthermore, the control system includes an actuator 22 which has two actuators 24, 26. The two actuators 24, 26 are electrically controlled components and operate in accordance with the moving coil or solenoid principle. Actuator 24 applies a compressive or tensile force in direction 20 to the control lever 12. Actuator 26 applies a compressive or tensile force in direction 18 to the control lever. Actuators 24, 26 include sensors (not shown) to detect the current position of the control lever 12 and to transmit position signals to the control unit 14. A sensor 16 detects the angle between the horizontal and the boom of the front loader. The present height of the loader shovel can be determined from the boom angle. The sensor 16 detects this angle signal and generates an electric signal which is transmitted to the control unit 14. The control unit 14 determines the current height of the loader shovel with reference to the angle signal.

According to the invention, the actuator 22 and therefore the actuators 24, 26 are controlled by the control unit 14 as a function of the present state of the front loader so that that the control lever 12 can be subjected to a changed predetermined force. A non-optimal or an unsafe operating state of the of the tractor or the front loader can therefore be made noticeable to an operator. Accordingly, the operating characteristic of the control lever 12 can be changed by subjecting the control lever 12 to a predetermined changed force by the actuator 22. The actuators 24, 26 can be actuated electrically, pneumatically or hydraulically.

The tractor 28 of FIG. 2 includes the control system of FIG. 1. The front loader 30, which has a boom 32 and a loader shovel 34, is adapted to the tractor 28. The boom 32 of the front loader 30 may be raised and/or lowered by the dual-acting hydraulic cylinder 36.

A plurality of sensors are arranged on the tractor 28 and/or the front loader 30, not all of the sensors being required to carry out the present invention. Thus, the travel of the piston rod of the hydraulic cylinder 36 can be determined by sensor 38. Sensor 40 senses the change in the volumetric flow of the hydraulic fluid, which is supplied by the hydraulic cylinder 36 and which flows out of the hydraulic cylinder 36. Sensor 42 senses the hydraulic fluid pressure present in the piston space of the hydraulic cylinder 36. The sensor 44 detects the vehicle speed over the ground. Sensor 46 detects the rotational speed of a wheel, such as the left front wheel 48. Other sensors (not shown), are likewise provided for the other three wheels. The sensor 50 detects the steering angle of the front wheel 48. The sensor 52 detects an acceleration of the tractor 28. The sensor 54 detects the force, which an implement (not shown) which is coupled to the tractor 28, exerts on the tractor 28. Sensor 56 senses the torque transmitted to the rear travel drive. Furthermore, a GPS receiver 58 receives GPS position signals, from which the control unit 14 determines the current position of the tractor 28. All of the sensors are connected to the control unit 14 by means of electric lines. The actuator 22 is also connected to the control unit 14. Further sensors (not shown) may also be provided for sensing other variables and the status of the vehicle or of a vehicle or implement operating function.

Figure 3B:
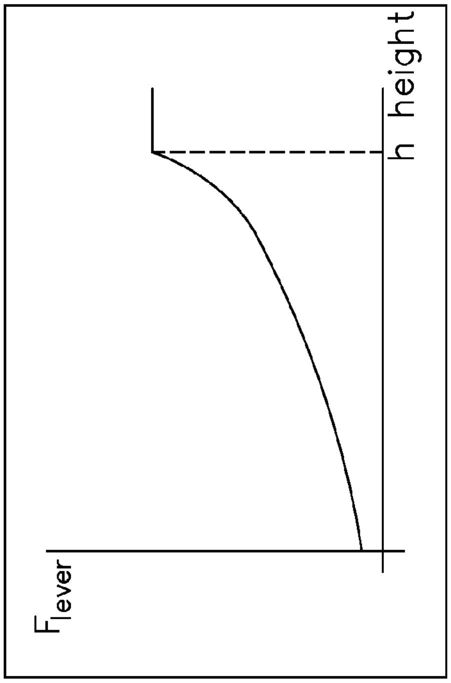
FIG. 3*b* is a diagram of the force exerted on the control lever as a function of the height of the loader shovel of FIG. 3*a;*
Figure 3A:
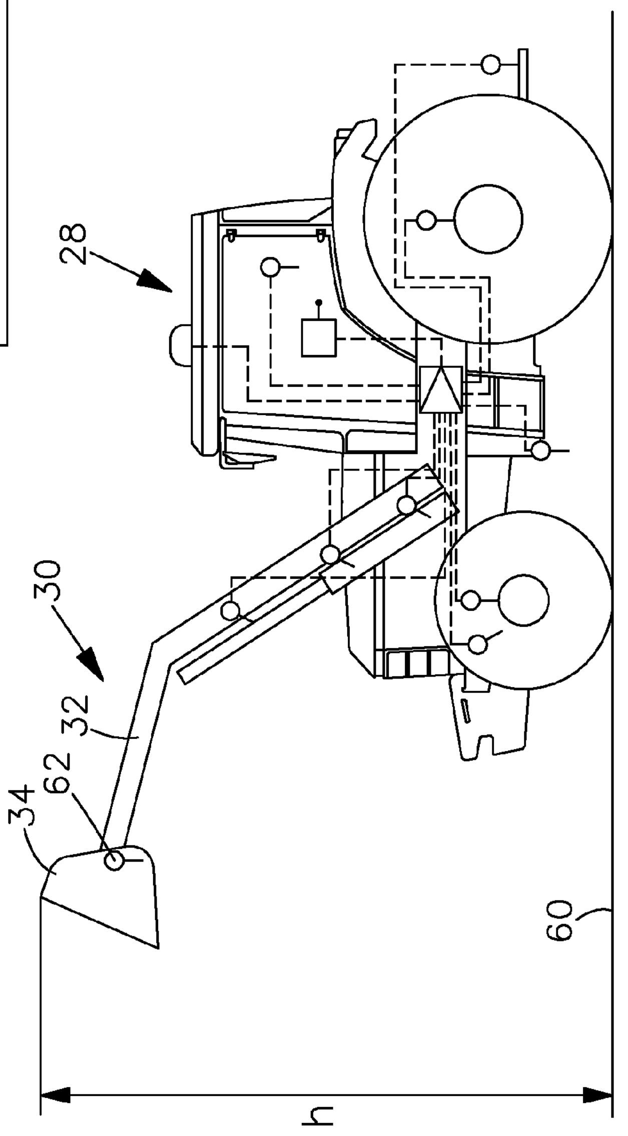
FIG. 3*a* is a side view of an agricultural vehicle with a loader and a loader shovel at a predetermined height.

FIG. 3*a* shows a tractor 28 with a front loader 30. The front loader 30 includes a boom 32 and a boom tool which is a loader bucket or shovel 34. The boom 32 is in a raised position. The loader shovel 34 is at a maximum height or distance h from the ground 60. This height can be determined by the sensor 38 (not shown in FIG. 3*a*) which senses the travel of the hydraulic cylinder 36 (see FIG. 2) and by tilting angle sensor 62 which senses the tilting angle of the loader shovel 34. FIG. 3*b* shows the force exerted on the control lever 12 as a function of the height of the loader shovel 34.

The deflection of the control lever 12 usually causes the corresponding front loader operating function to be switched on or off (in the context of binary logic). For example, when the control lever 12 is deflected forward, the boom is raised. It could be provided that, as a function of a larger deflection angle of the control lever 12, the boom 32 is raised more rapidly than is the case with a small deflection angle of the control lever 12. Accordingly, the control unit 14 could take this fact into consideration and could exert a greater force on the control lever 12 if the control lever 12 is deflected by a greater angle.

The force profile of FIG. 3*b* shows that the force exerted on the control lever 12 by the actuator 24 rises with the increasing height of the loader shovel 34. The force profile shows an analytical function which rises continuously in the region between a height 0 and h. At a height of the loader shovel 34 which approaches the value h, the actuator 24 opposes the deflection of the control lever 12 with a greater amount of force than is the case at a lower height of the loader shovel 34. This signals to the operator operating the control lever 12 that the loader shovel 34 is approaching the maximum height h for the present application. If the boom 32 and therefore the loader shovel 34 are to be deflected further over the height h, which is entirely conceivable from the design of the front loader 30, the control lever 12 is subjected to a substantially constant force, as shown for values greater than h in the diagram of FIG. 3*b*. The operator can change and accordingly store the value of the height h as a function of his specific use.

Figure 4B:
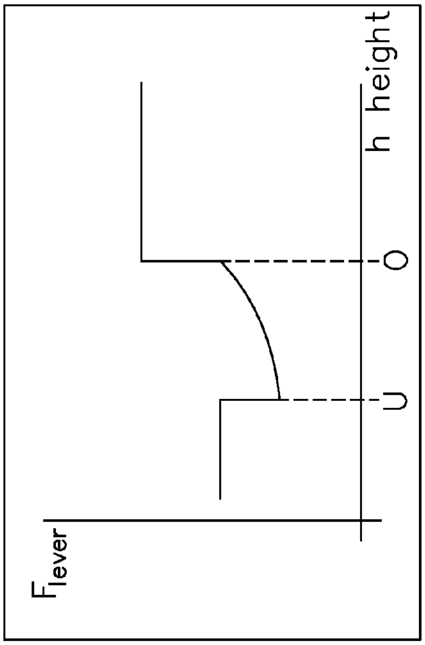
FIG. 4*b* is a diagram of the force exerted on the control lever as a function of the height of the loader shovel of FIG. 4*a;*
Figure 4A:
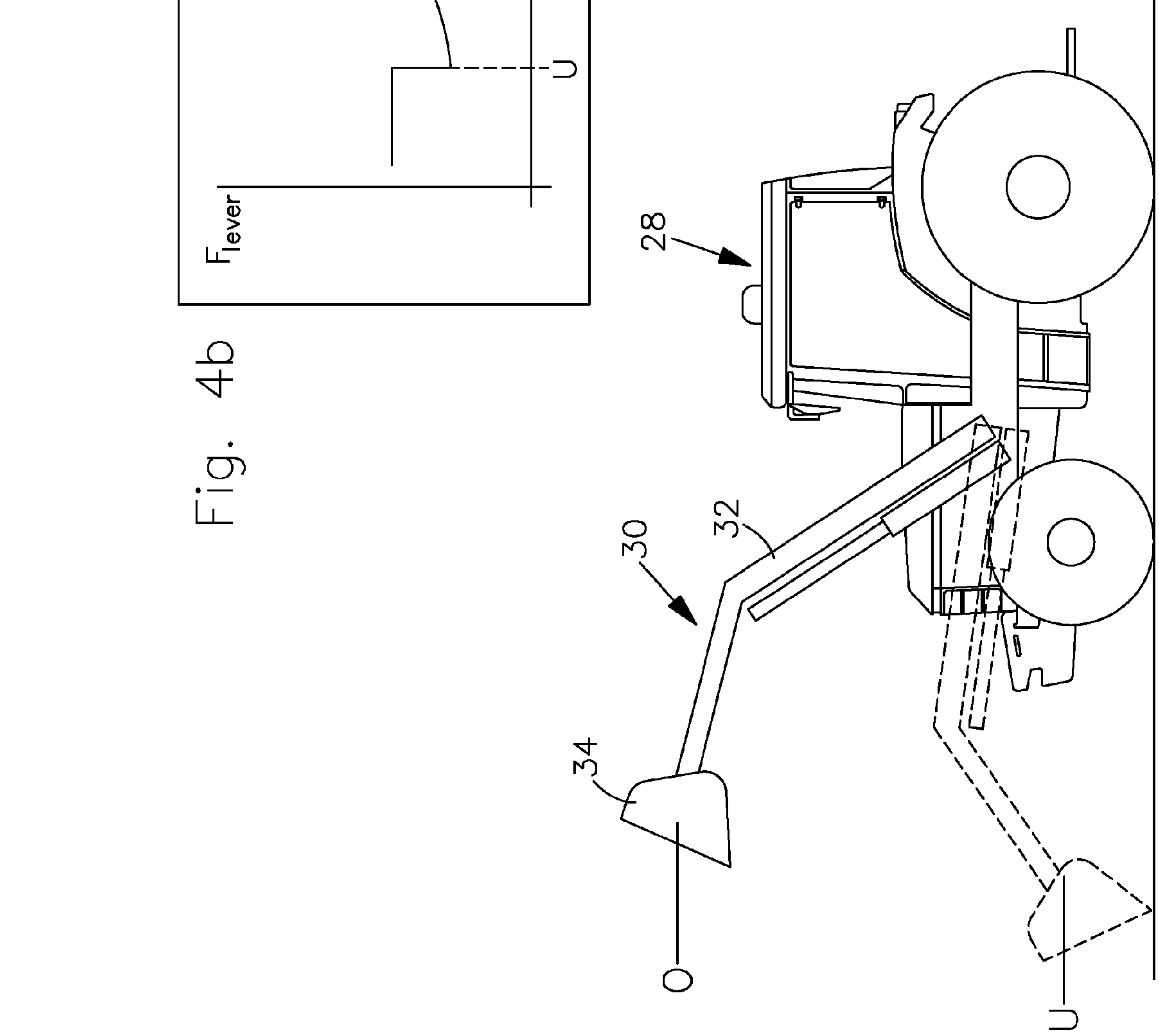
FIG. 4*a* is a side view of an agricultural vehicle with a loader showing a height range for the loader shovel.

In FIG. 4*a*, the tractor 28 is shown with the front loader 30 from FIGS. 2 and 3*a*. The boom 32 in FIG. 4*a* is in an upper position indicated by O. The boom 32 can be in a lower position which is shown by dashed lines and is indicated by U. In this exemplary embodiment, these two positions O and U are intended to indicate the corresponding heights of the suitable picking-up and loading heights for special front loader operations.

FIG. 4*b* shows the force exerted on the control lever 12 as a function of the height of the loader shovel 34. As shown in this diagram, the force exerted on the control lever 12 by the actuator 24 is constant in a region between U and O and rises with the increasing height of the loader shovel 34. The force exerted on the control lever 12 is smaller in this region than the force exerted in a region less than U or greater than O. This imparts to the operator the sensation that he can deflect the control lever 12 against an end stop in the event of a deflection which takes place in a height region of the loader shovel 34 lying between the predetermined values O and U. A greater resetting force of the control lever 12 is brought to the operators awareness if the height of the boom 32 approaches the value O. It can also be seen from the diagram from FIG. 4*b* that, when the loader shovel 34 is in a region outside the interval U to O, a greater resetting force is exerted on the control lever 12. Accordingly, it is therefore possible for an operator to be able to override such a measure of the active force feedback and he therefore always retains control over the vehicle or the implement, but may enter an unsafe operating state. Also in this exemplary embodiment, it is possible for an operator to predetermine other values for the two positions U and O for the system and to correspondingly store them (for example by means of a keyboard input (not shown in the Figures) or by means of a corresponding menu guide with the aid of a display unit).

Figure 5B:
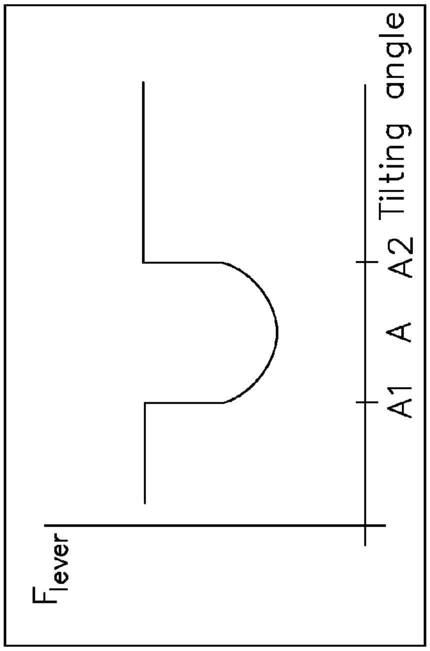
FIG. 5*b* is a diagram of the force exerted on the control lever as a function of the tilting angle of the loader shovel.
Figure 5A:
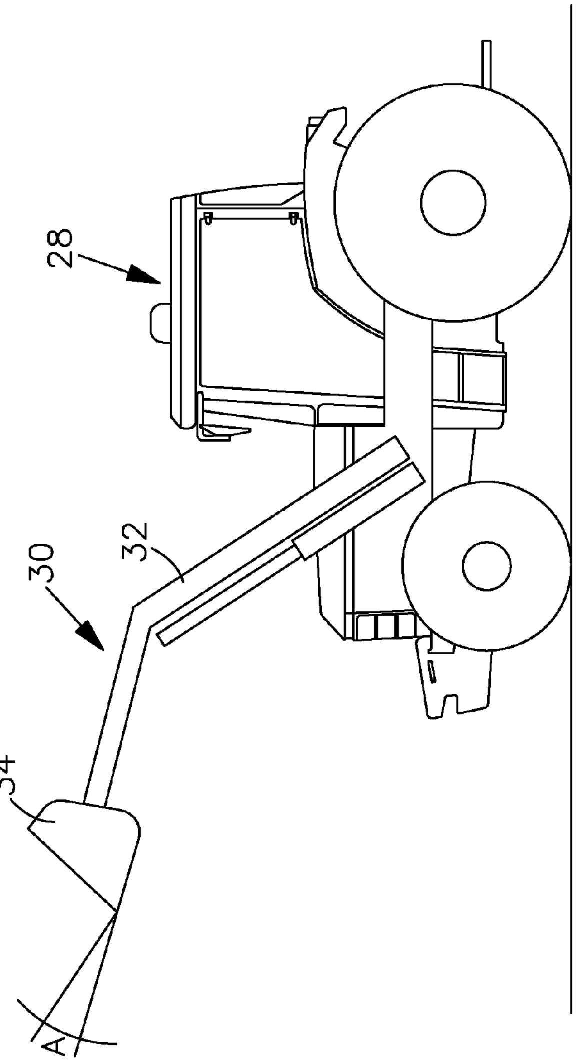
FIG. 5*a* is a side view of an agricultural vehicle with a loader showing a desired range of the loader shovel or bucket tilting angle.

FIG. 5*a* also shows the tractor 28 from FIG. 4*a* with the front loader 30. In FIG. 5*a* the loader shovel 34 can be tilted about a tilting angle range A predetermined by the operator for a special application. Accordingly, the control lever 12 is subjected to a force which is shown in the diagram of FIG. 5*b*. Comparably to the diagram from FIG. 4*b*, in the case of the diagram according to FIG. 5*b*, the force to which the control lever 12 is subjected when the loader shovel 34 is in the tilting angle range A is designed to be smaller than is the case on the far side of the tilting angle range A. Within the tilting angle range A, the control lever 12 is subjected to a rising force if the tilting angle of the loader shovel 34 approaches the lower tilting angle A1 or the upper tilting angle A2. In this respect, this makes the operator aware of the fact that the loader shovel 34 is approaching the lower or upper tilting angle A1, A2. This also in particular assists the untrained operator in the operation of the front loader 30. Furthermore, it is also possible to set the tilting angle of the loader shovel 34 on the far side of the lower or upper tilting angle A1, A2. In this case, the operator has to apply at least a correspondingly high force to which the control lever 12 is subjected if the tilting angle of the loader shovel 34 is outside the tilting angle range A.

The exemplary embodiments shown in FIGS. 3*a* to 5*a* relate merely to the control of an control lever 12 which is a joystick and by means of which a front loader 30 is controlled. In a corresponding manner, a different function of the vehicle or of the tractor 28 could be controlled, for example the three-point implement attachment, the control of the gear or the hand throttle setting. The same applies to an implement possibly adapted to the vehicle, for example a cutter bar or a round baler.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. A control system for controlling a self-propelled tractor, comprising:

a manually operable control lever for generating a control signal;

an actuator for applying a force to the control lever;

at least one sensor; and a control unit for determining an operating state of the self-propelled tractor, the sensor supplying a parameter signal to the control unit;

wherein the control unit, depending on the operating state of the self-propelled tractor, causing the actuator to apply a predetermined force to the control lever to make the operator aware of an operating condition, and the control unit varying the force applied to the control lever as a function of the parameter signal so that the operator can re-find a setting, a deflection position or a deflection range of the control lever; and wherein the control unit generates a visual and/or an acoustic signal.

2. The control system of claim 1, wherein:

a level of the force applied to control lever can be set by the operator.

3. The control system of claim 1, wherein:

the actuator applies the force to the control lever to help the operator avoid an unfavorable setting range of an operating state.

4. The control system of claim 1, wherein:

the force depends on a state of another operating element of the vehicle.

5. The control system of claim 1, wherein:

the force applied to the control lever by the actuator can be overridden and/or switched off by the operator.

* * * * *